US012794131B2

(12) United States Patent
Chiang

(10) Patent No.: US 12,794,131 B2
(45) Date of Patent: Nov. 10, 2026

(54) ANTENNA DEVICE HAVING A PLURALITY OF RADIATION DIRECTIONS AND IMPROVED GAIN

(71) Applicant: MEDIATEK INC., Hsin-Chu (TW)

(72) Inventor: Chung-Hsin Chiang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 141 days.

(21) Appl. No.: 18/806,667

(22) Filed: Aug. 15, 2024

(65) Prior Publication Data

US 2025/0079714 A1 Mar. 6, 2025

Related U.S. Application Data

(60) Provisional application No. 63/579,302, filed on Aug. 29, 2023.

(51) Int. Cl.
*H01Q 9/04* (2006.01)
*H01Q 1/24* (2006.01)

(52) U.S. Cl.
CPC ........... *H01Q 9/0485* (2013.01); *H01Q 1/241* (2013.01)

(58) Field of Classification Search
CPC .. H01Q 9/048501; H01Q 9/0407; H01Q 1/12; H01Q 1/36; H01Q 1/002; H01Q 3/01; H01Q 9/0485; H01Q 1/241
See application file for complete search history.

(56) References Cited

U.S. PATENT DOCUMENTS

2009/0237320 A1* 9/2009 Higashi .................... H01Q 1/36 438/34
2011/0006963 A1* 1/2011 Tani ..................... H01Q 9/0407 343/700 MS
2020/0127376 A1* 4/2020 Kang ................... H05K 1/0277
2020/0260051 A1* 8/2020 Shin ......................... H01Q 1/24
2022/0368003 A1* 11/2022 Chiang ................ H01Q 9/0485
2023/0109587 A1* 4/2023 Lee ...................... H01Q 1/2266 343/702
2023/0231305 A1* 7/2023 Chiang .................... H01Q 1/38 343/700 MS
2023/0307849 A1* 9/2023 Hsieh ................... H01Q 1/2283
2024/0155900 A1* 5/2024 Wang ................... H10K 59/131
2024/0258712 A1* 8/2024 Chang .................... H01Q 1/241
2025/0038412 A1* 1/2025 Liu ...................... H01Q 1/2283

FOREIGN PATENT DOCUMENTS

CN 115149250 A * 10/2022 ............... H01Q 1/36
KR 10-2019-0010258 A 1/2019

* cited by examiner

*Primary Examiner* — Dameon E Levi
*Assistant Examiner* — Jose A. Miranda Gonzalez
(74) *Attorney, Agent, or Firm* — Winston Hsu

(57) ABSTRACT

An antenna device can include an antenna and a supporting member. The antenna is used to radiate an electromagnetic wave. The supporting member is used to accommodate and support the antenna. The supporting member has a storage space where the antenna is disposed. The supporting member further has a first aperture facing the first direction, and a second aperture facing a second direction different from the first direction. The antenna radiates the electromagnetic wave in the first direction through the first aperture and in the second direction through the second aperture.

19 Claims, 15 Drawing Sheets

ANTENNA DEVICE HAVING A PLURALITY OF RADIATION DIRECTIONS AND IMPROVED GAIN

CROSS REFERENCE TO RELATED APPLICATIONS

This application claims the benefit of U.S. Provisional Application No. 63/579,302, filed on Aug. 29, 2023. The content of the application is incorporated herein by reference.

BACKGROUND

In light of the progressive advancements in technology and the escalating demands of communication products, the significance of the antenna incorporated within such products is of considerable importance. At present, antennas can be strategically positioned within communication apparatuses to facilitate the reception and transmission of signals, thereby enabling communication. However, upon examination of existing products, it is discernible that the majority of antennas, when affixed within communications devices, are restricted to a singular radiation direction. Furthermore, the peak gain of these antennas is considerably constrained. Consequently, there remains a conspicuous absence of viable solutions aimed at enhancing the performance of these antennas. This underscores the pressing need for innovative strategies to address this prevailing issue.

SUMMARY

An embodiment provides an antenna device including an antenna and a supporting member. The antenna is used to radiate an electromagnetic wave. The supporting member is used to accommodate and support the antenna. The supporting member has a storage space where the antenna is disposed. The supporting member also has a first aperture facing the first direction, and a second aperture facing a second direction different from the first direction. The antenna radiates the electromagnetic wave in the first direction through the first aperture and in the second direction through the second aperture.

These and other objectives of the present invention will no doubt become obvious to those of ordinary skill in the art after reading the following detailed description of the preferred embodiment that is illustrated in the various figures and drawings.

DETAILED DESCRIPTION

In the context below, when it is mentioned that A is substantially equal to B, it means that the difference between A and B is less than 5% of either A or B.

Figure 1:
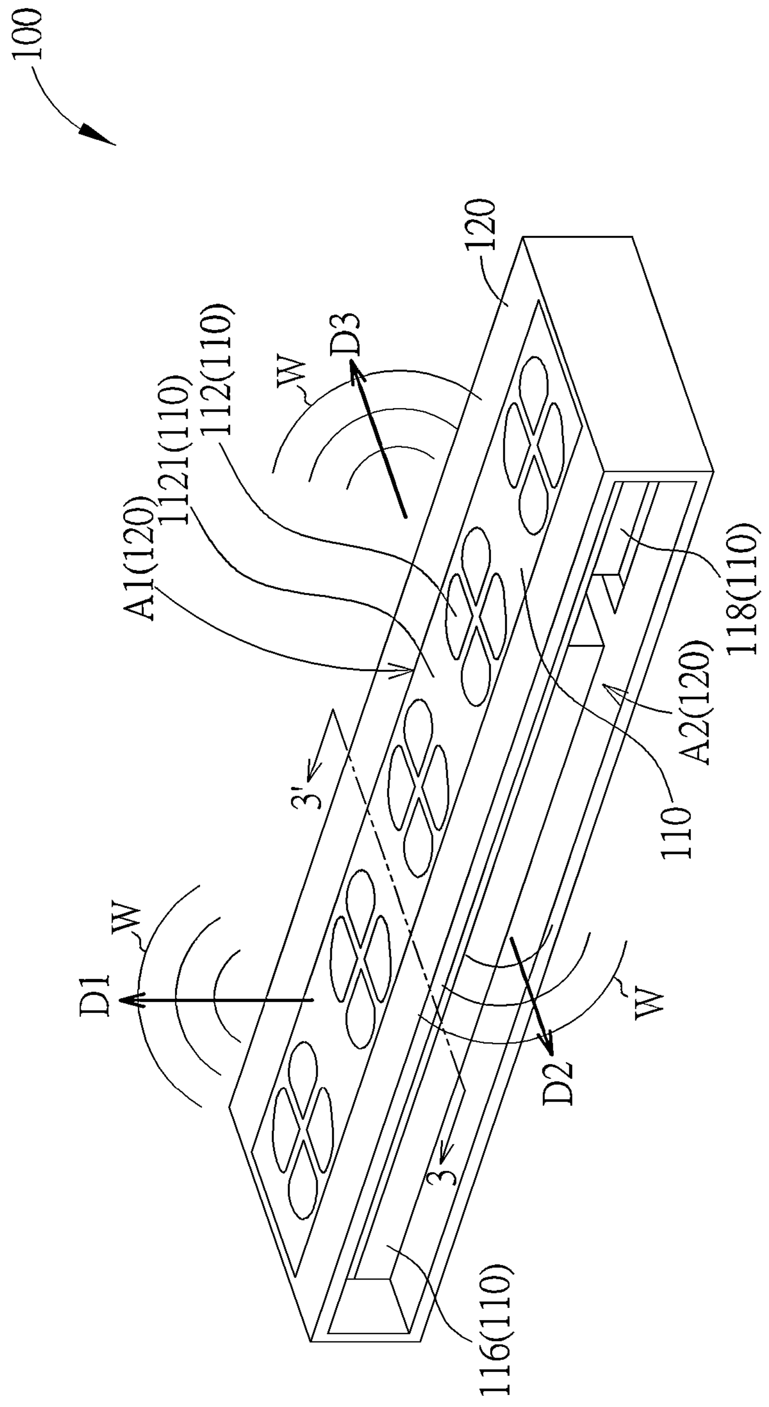
FIG. 1 illustrates an antenna device according to an embodiment.
Figure 2:
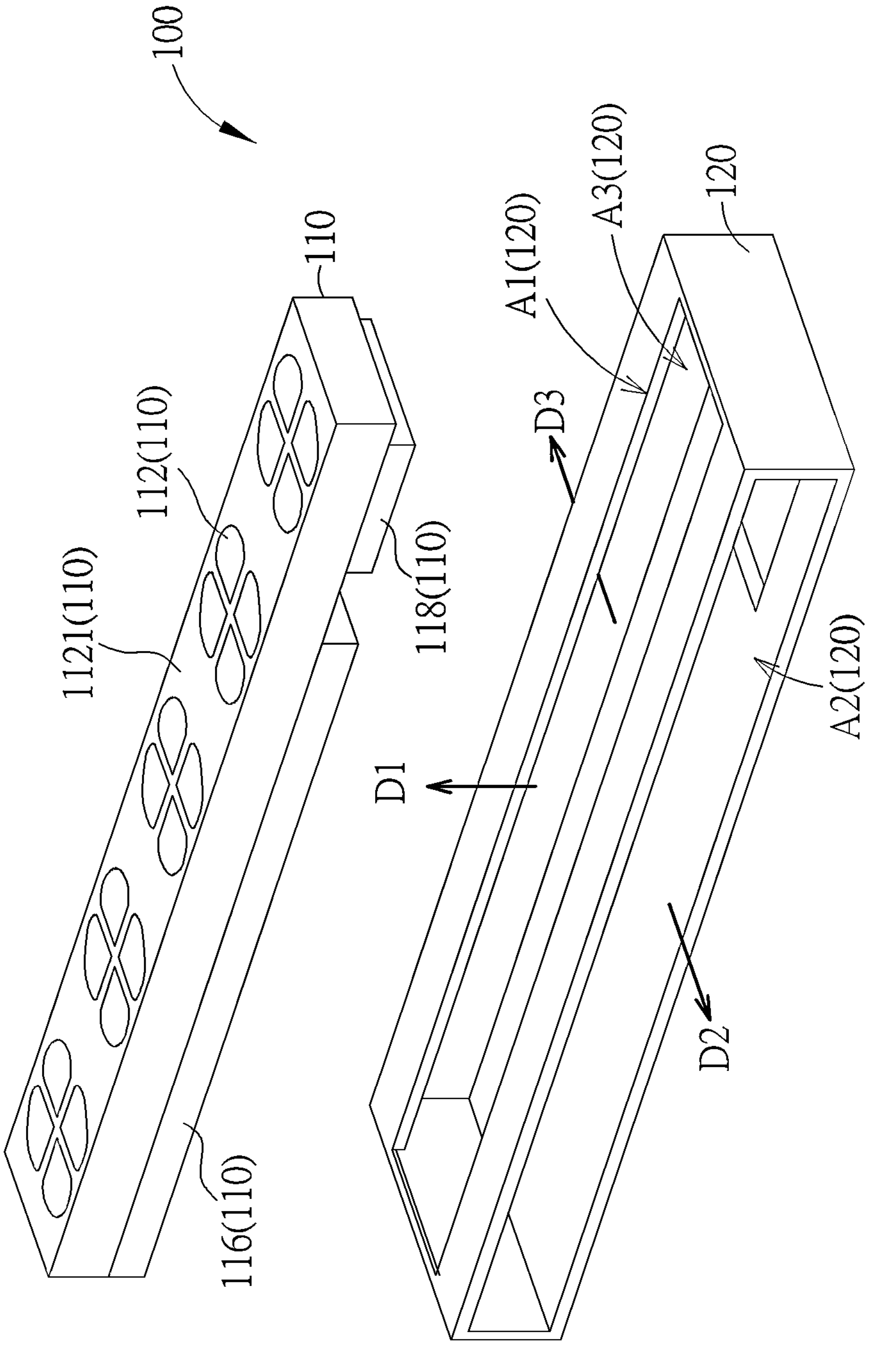
FIG. 2 illustrates the antenna device in FIG. 1 in an exploded view.

FIG. 1 illustrates an antenna device 100 according to an embodiment. FIG. 2 illustrates the antenna device 100 in FIG. 1 in an exploded view. In FIG. 2, the antenna 110 and the supporting member 120 are separated for facilitating explanation and understanding. The antenna device 100 can include an antenna 110 and a supporting member 120. The antenna 110 can radiate an electromagnetic wave W for wireless communications.

The antenna 110 can include a conductive plate 112, a circuit 116 and a connector 118. The conductive plate 112 can be formed using a metal layer and be used to radiate an electromagnetic wave W. The conductive plate 112 can be fixed with a dielectric layer 1121 and be exposed to radiate the electromagnetic wave W. The circuit 116 can be disposed in a molding compound layer and be linked to the conductive plate 112. The circuit 116 can process a signal corresponding to the electromagnetic wave W. The circuit 116 can include a radio-frequency integrated circuit (RFIC), a power management integrated circuit (PMIC), a resistor, an inductor and/or a capacitor. The connector 118 can be coupled to the circuit 116 to transmit the signal to an external circuit such as an external processor.

The supporting member 120 can accommodate, support and affix the antenna 110. The supporting member 120 can be fixed inside a communications device (e.g. mobile phone) with a screw, a latch, a fastener, welding and/or adhesive to install the antenna 110 in the communications device. Parts of communications device that may block the electromagnetic waves radiated by the antenna 110 should be made of non-metallic materials, such as plastic.

The supporting member 120 can be fabricated from a material that possesses both sufficient hardness and electrical conductivity, such as metal, or other appropriate materials. The supporting member 120 can have a storage space where the antenna 110 is disposed. The supporting member 120 can have a first aperture A1 facing the first direction D1, and a second aperture A2 facing a second direction D2 different from the first direction D1.

The antenna 110 disposed in the supporting member 120 can radiate the electromagnetic wave W in the first direction D1 through the first aperture A1 and in the second direction D2 through the second aperture A2.

As shown in FIG. 2, the supporting member 120 can further have a third aperture A3 facing a third direction D3 different from the first direction D1 and the second direction D2. The antenna 110 can also radiate the electromagnetic wave W in the third direction D3 through the third aperture A3.

Hence, the first direction D1, the second direction D2 and the third direction D3 can be radiation directions of the antenna device 100. As a result, the antenna device 100 can have a plurality of radiation directions to have an improved radiation pattern and communications performance. By adjusting the structure of the supporting member 120, the positions of the first aperture A1, the second aperture A2 and the third aperture A3 can be adjusted, thereby adjusting the first direction D1, the second direction D2 and the third direction D3.

The second direction D2 can be substantially perpendicular to the first direction D1. The third direction D3 can be substantially perpendicular to the first direction D1 and opposite to the second direction D2.

Figure 3:
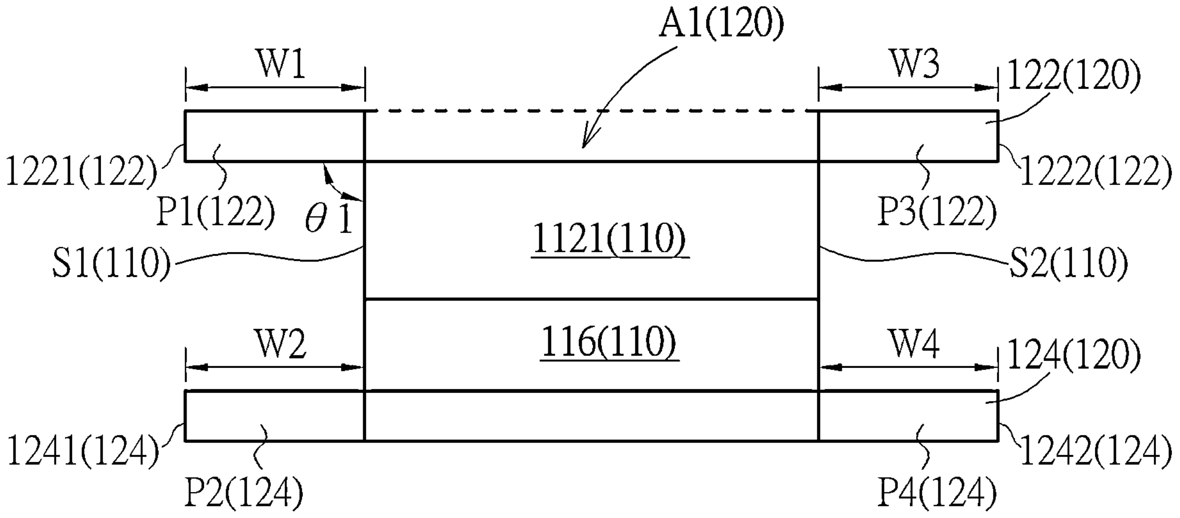
FIG. 3 illustrates a sectional of the antenna device in FIG. 1 along the line 3-3' according to an embodiment.

FIG. 3 illustrates a sectional of the antenna device 100 in FIG. 1 along the line 3-3' according to an embodiment. As shown in FIG. 1 and FIG. 3, the supporting member 120 can include a first conductive sheet 122 and a second conductive sheet 124. The antenna 110 can be disposed between the first conductive sheet 122 and the second conductive sheet 124. The first aperture A1 can be formed on the first conductive sheet 122.

The first conductive sheet 122 can have a first conductive portion P1 between a first edge 1221 of the first conductive sheet 122 and a first side S1 of the antenna 110, and the second conductive sheet 124 can have a second conductive portion P2 between a first edge 1241 of the second conductive sheet 124 and the first side S1 of the antenna 110.

The first conductive portion P1 can have a width W1, and the second conductive portion P2 can have a width W2.

The first conductive portion P1 and the second conductive portion P2 can guide the propagation of the electromagnetic wave W to enhance the gain of the antenna 110. The width W1 and the width W2 can be greater than a predetermined length. For example, the predetermined length can be 0.03 times the wavelength of the electromagnetic wave W radiated by the antenna 110 to increase the antenna gain by at least 2.5 dB or at least 3.0 dB.

In some embodiments, the first conductive portion P1 and the second conductive portion P2 can have different widths. In other words, in FIG. 3, the width W1 can be different from the width W2 (i.e. W1≠W2).

In other embodiments, the first conductive portion P1 and the second conductive portion P2 can have the same width. In other words, in FIG. 3, the width W1 can be substantially equal to the width W2 (i.e. W1=W2).

The first conductive sheet 122 can further have a third conductive portion P3 between a second edge 1222 of the first conductive sheet 122 and a second side S2 of the antenna 110. The first side S1 and the second side S2 of the antenna 110 can be in parallel. The third conductive portion P3 can have a width W3. The first conductive portion P1 and the third conductive portion P3 can have different widths (i.e. W1≠W3). In other embodiments, the first conductive portion P1 and the third conductive portion P3 can have the same width (i.e. W1=W3).

The second conductive sheet 124 can further have a fourth conductive portion P4 between a second edge 1242 of the second conductive sheet 124 and the second side S2 of the antenna 110. The fourth conductive portion P4 can have a width W4. The second conductive portion P2 and the fourth conductive portion P4 can have different widths (i.e. W2≠W4). In other embodiments, the second conductive portion P2 and the fourth conductive portion P4 can have the same width (i.e. W2=W4).

Regarding the widths of the third conductive portion P3 and the fourth conductive portion P4, the third conductive portion P3 and the fourth conductive portion P4 can have different widths (i.e. W3≠W4), or the third conductive portion P3 and the fourth conductive portion P4 can have the same width (i.e. W3=W4). Various combinations of the widths W1 to W4 belong to the scope of embodiments.

As shown in FIG. 3, at least one of the first conductive portion P1 and the second conductive portion P2 can form a right angle (e.g. angle θ1) with the first side S1 of the antenna 110. At least one of the third conductive portion P3 and the fourth conductive portion P4 can form a right angle with the second side S2 of the antenna 110.

Figure 4:
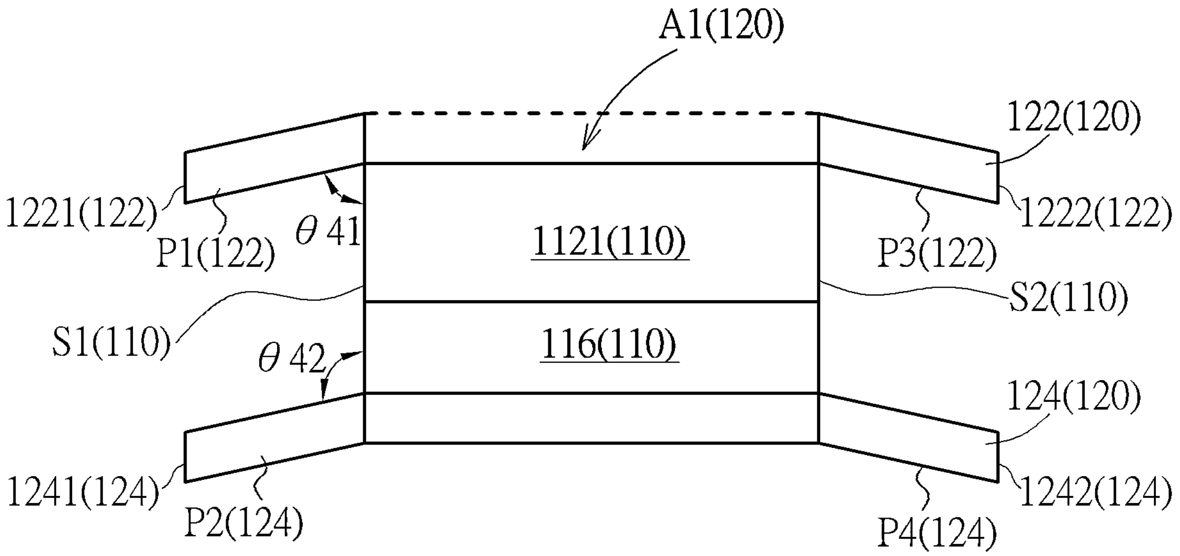
FIG. 4 illustrates a sectional of the antenna device in FIG. 1 along the line 3-3' according to another embodiment.

FIG. 4 illustrates a sectional of the antenna device 100 in FIG. 1 along a line 3-3' according to another embodiment. At least one of the first conductive portion P1 and the second conductive portion P2 may not be perpendicular to the first side S1 of the antenna 110. As shown in FIG. 4, the first portion P1 and the first side S1 of the antenna 110 can form an acute angle θ41, and the second portion P2 and the first side S1 of the antenna 110 can form an obtuse angle θ42. At least one of the third conductive portion P3 and the fourth conductive portion P4 may not be perpendicular to the second side S2 of the antenna 110. The third portion P3 and the second side S2 of the antenna 110 can form an acute angle, and the fourth portion P4 and the second side S2 of the antenna 110 can form an obtuse angle.

Figure 5:
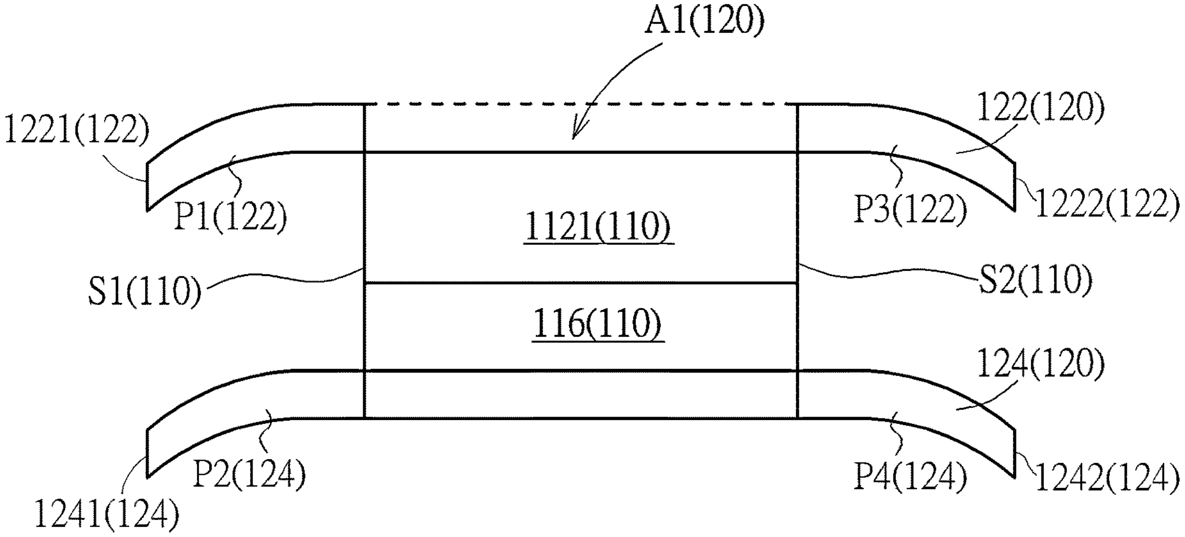
FIG. 5 illustrates a sectional of the antenna device in FIG. 1 along the line 3-3' according to another embodiment.

FIG. 5 illustrates a sectional of the antenna device 100 in FIG. 1 along a line 3-3' according to another embodiment. As shown in FIG. 5, at least one of the first conductive portion P1, the second conductive portion P2, the third conductive portion P3 and the fourth conductive portion P4 can have an arc shape.

By adjusting the widths and shapes of the first conductive portion P1, the second conductive portion P2, the third conductive portion P3 and the fourth conductive portion P4, the directions and results of guiding the electromagnetic wave W can be optimized, thereby improving the gain of the antenna 110.

Figure 6:
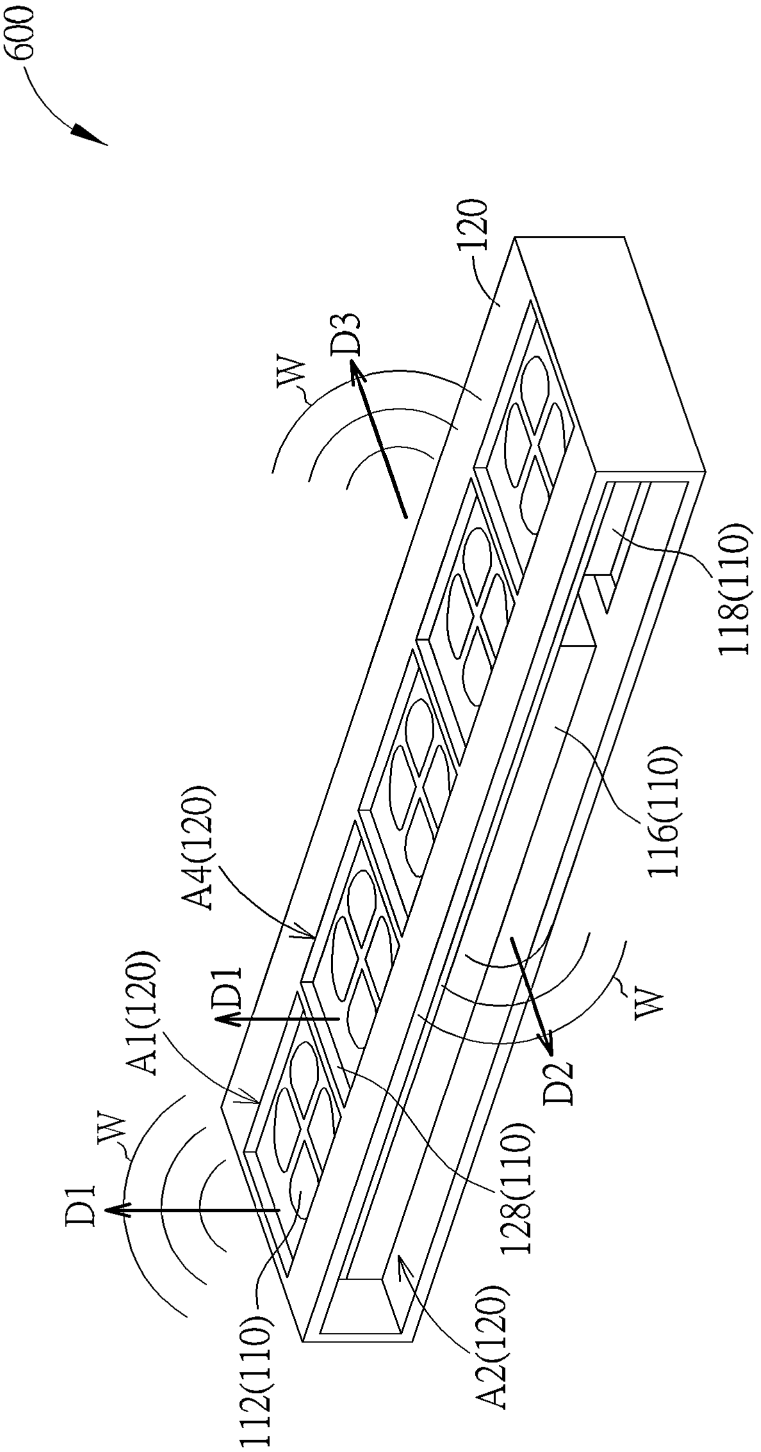
FIG. 6 illustrates an antenna device according to another embodiment.

FIG. 6 illustrates an antenna device 600 according to another embodiment. The similarities in FIG. 1, FIG. 2 and FIG. 6 will not be reiterated. The antenna device 600 can further have a fourth aperture A4 facing the first direction D1 and formed on the first conductive sheet 122. The first conductive sheet 122 can include a reinforcement bar 128 used to separate the first aperture A1 and the fourth aperture A4 and reinforce the structure of the supporting member 120. Regarding FIG. 1 and FIG. 6, the supporting member 120 in FIG. 1 can have the larger first aperture A1 without the reinforcement bar 128, hence, when a communications device housing the antenna device 600 is impacted, the supporting member 120 may be prone to deformation or damage. In FIG. 6, the supporting member 120 can have smaller apertures (e.g. A1 and A4) facing the first direction D1 to replace the larger first aperture A1 in FIG. 1. With the reinforcement bars 128 in FIG. 6, the supporting member 120 can exhibit higher impact resistance and reliability. The roles of the first aperture A1 and the fourth aperture A4 in FIG. 6 can be similar to that of the first aperture A1 in FIG. 1. The antenna 110 in FIG. 6 can radiate the electromagnetic wave W in the first direction D1 through the first aperture A1 and the fourth aperture A4. The reinforcement bars 128 should not obstruct the conductive plates 112 of the antenna 110 to avoid affecting the radiation of the electromagnetic wave W. If the antenna 110 has a smaller size, or the structure of the antenna 110 is strong enough, no reinforcement bar 128 is needed, and the structure in FIG. 1 can be employed. When the antenna 110 has a larger size, the reinforcement bar 128 can be employed to develop the structure shown in FIG. 6.

Figure 7:
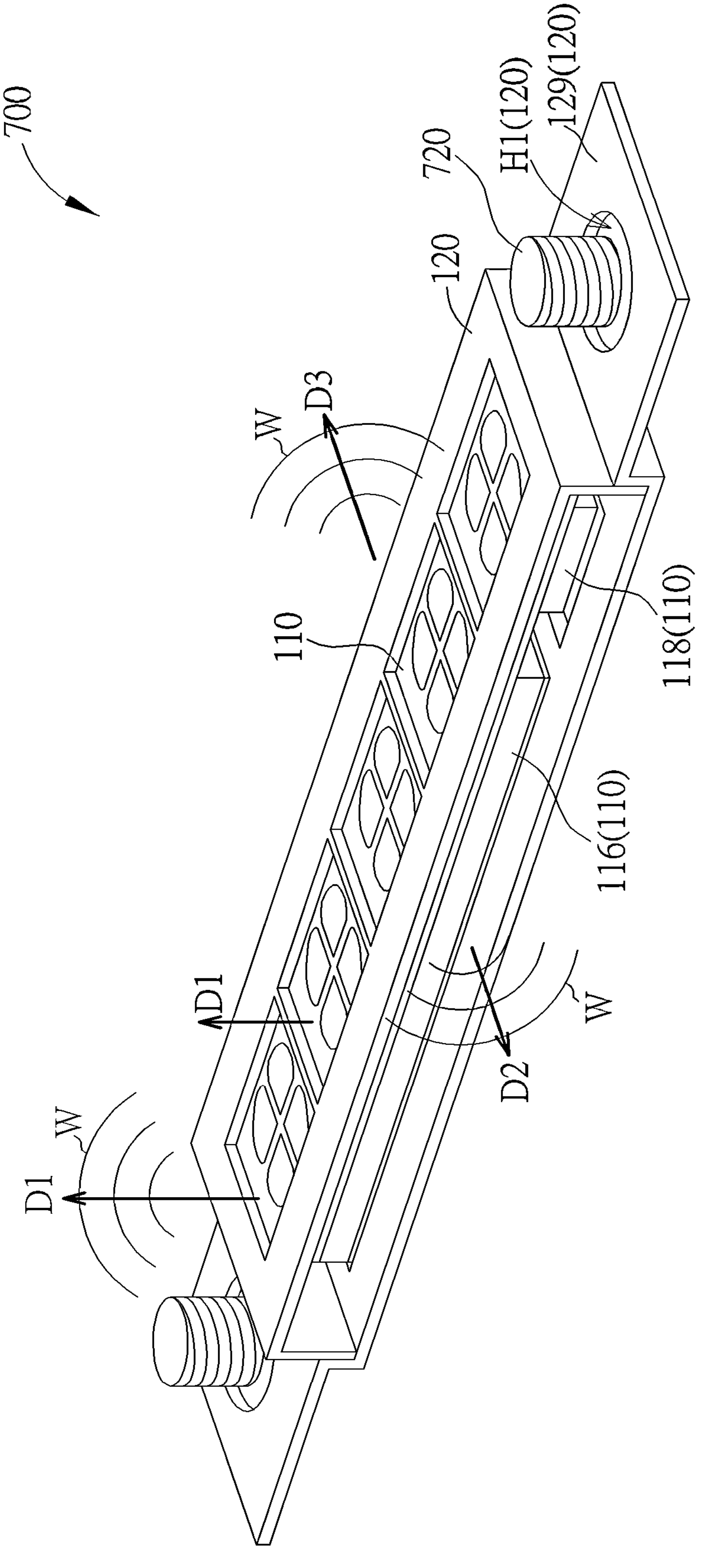
FIG. 7 illustrates an antenna device according to another embodiment.

FIG. 7 illustrates an antenna device 700 according to another embodiment. The similarities of antenna device 700 and abovementioned antenna devices will not be reiterated. In FIG. 7, the supporting member 120 can further include at least one secure portion 129 having a hole H1 for securing the supporting member 120 onto a wireless communications device (e.g. mobile phone) with a screw 720.

Figure 8:
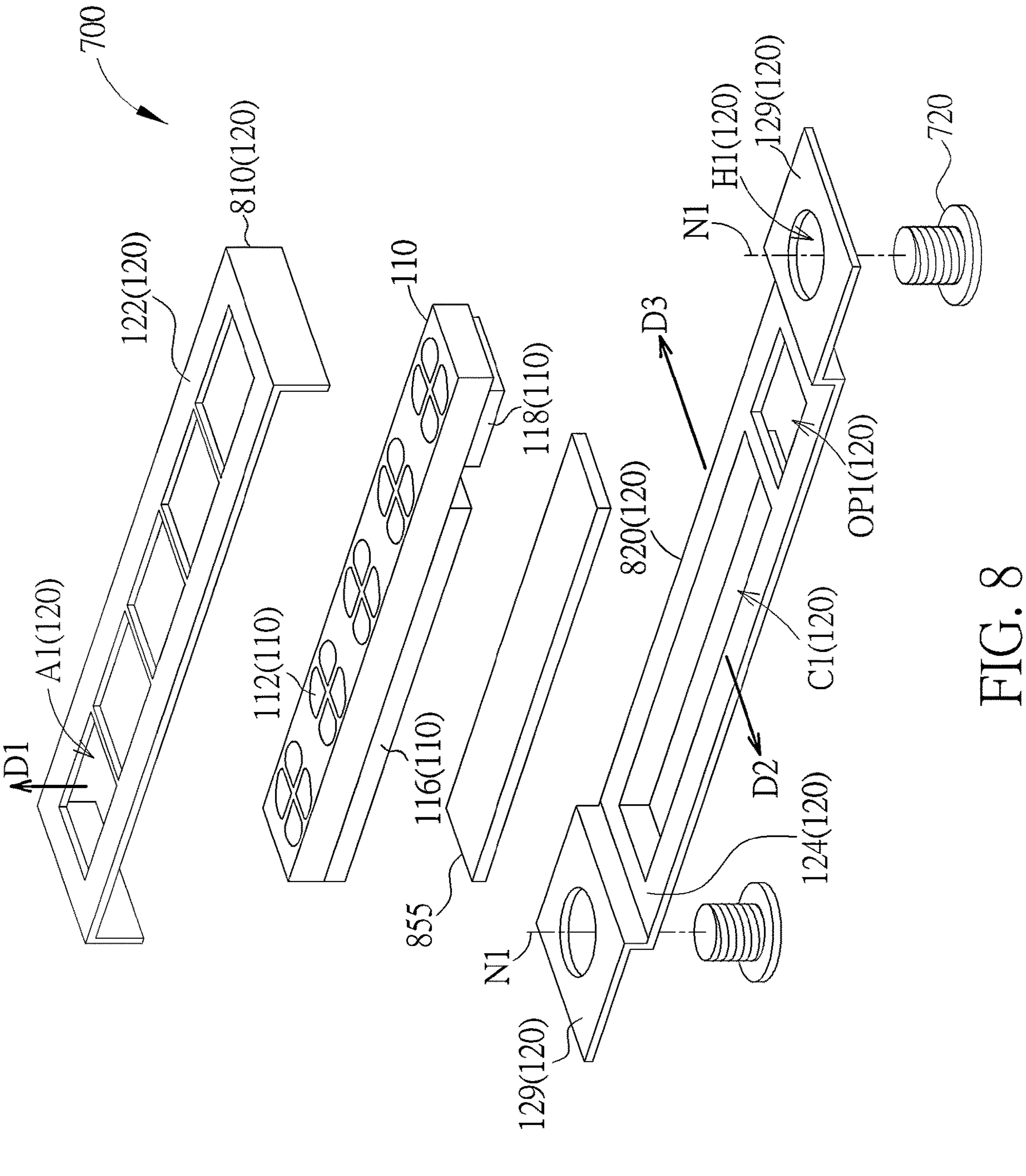
FIG. 8 illustrates the antenna device of FIG. 7 in an exploded view.

FIG. 8 illustrates the antenna device 700 of FIG. 7 in an exploded view. As shown in FIG. 8, the supporting member 120 can be formed by combining a first conductive component 810 and a second conductive component 820. The first conductive component 810 can be disposed corresponding to the conductive plate 112 of the antenna 110. The first conductive component 810 can include the first conductive sheet 122 described above. The second conductive component 820 can be disposed corresponding to the circuit 116 and the connector 118 of the antenna 110. The supporting member 120 can further have an opening OP1 formed on the second conductive component 820, and the connector 118 can be coupled to the external circuit through the opening OP1. The first aperture A1 can be formed on the first conductive component 810, the second aperture A2 can be formed between first conductive component 810 and the second conductive component 820. Optionally, the second conductive component 820 has a cavity Cl to dispose a thermal pad 855 to improve heat dissipation.

As shown in FIG. 7 and FIG. 8, a normal N1 of the secure portion 129 can be in line with the first direction D1, hence the screw 720 can pass through the hole H1 in a direction in parallel to the normal N1.

In FIG. 7 and FIG. 8, the secure portion 129 is formed with the second conductive component 820 disposed corresponding to the circuit 116. However, embodiments are not limited thereto. A secure portion can be formed on a conductive component corresponding to the conductive plate of the antenna.

Figure 9:
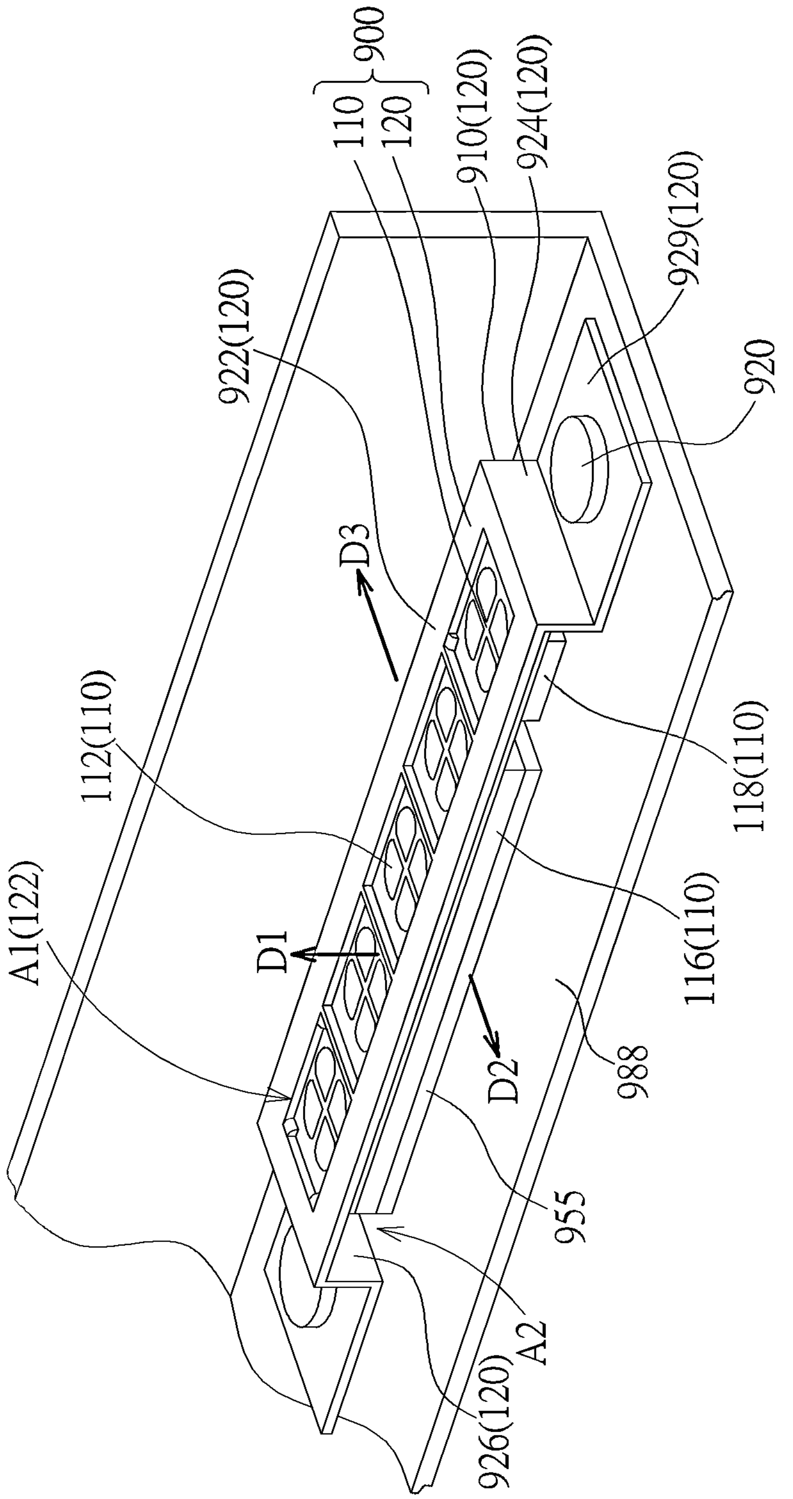
FIG. 9 illustrates an antenna device fixed on an external board according to an embodiment.
Figure 10:
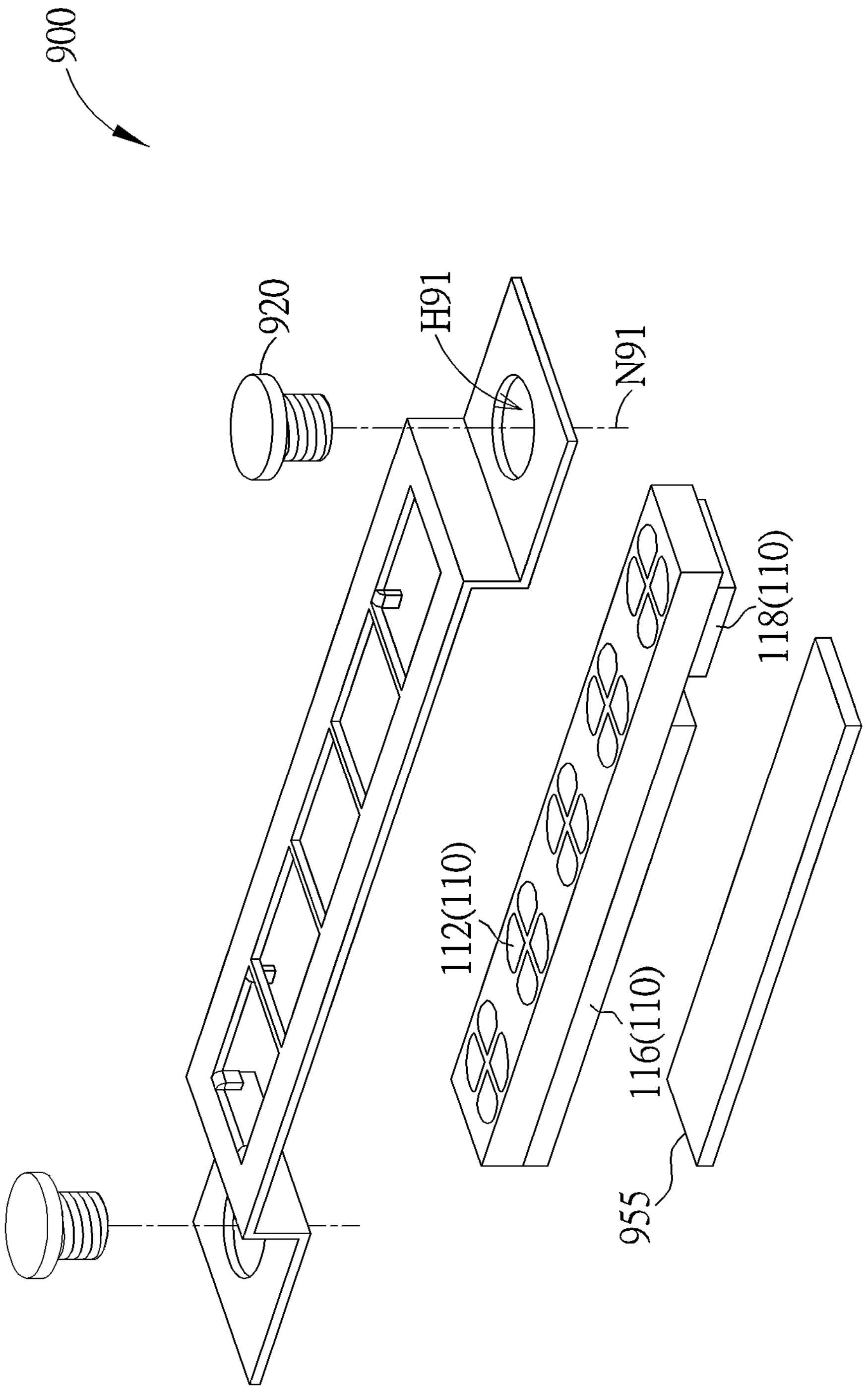
FIG. 10 illustrates the antenna device of FIG. 9 in an exploded view.

FIG. 9 illustrates an antenna device 900 fixed on an external board 988 according to an embodiment. FIG. 10 illustrates the antenna device 900 of FIG. 9 in an exploded view. For example, the external board 988 can be a printed circuit board (PCB), an inner wall or a suitable board in a mobile phone. The antenna device 900 can include the antenna 110 and the supporting member 120. The supporting member 120 can be formed with a conductive component 910 disposed corresponding to the conductive plate 112 of the antenna 110. The conductive component 910 can include a conductive sheet 922 and two sidewalls 924 and 926 connected to the conductive sheet 922. The first aperture A1 can be formed on the conductive sheet 922. The second aperture A2 can be formed between the sidewalls 924 and 926. The conductive component 910 can further include a secure portion 929 connected to the sidewall 924. The secure portion 929 can have a hole H91, and a screw 920 can pass the hole H91 to secure the antenna device 900. Optionally, a thermal pad 955 can be disposed between the antenna 110 and the external board 988 for better heat dissipation.

In FIG. 9 and FIG. 10, a normal N91 of the secure portion 929 can be in line with the first direction D1, hence the screw 920 can pass through the hole H91 in a direction in parallel to the normal N91.

In FIG. 7 and FIG. 8, the screw 720 can be tightened in the first direction D1, and the screw 920 in FIG. 9 can be tightened in an opposite direction of the first direction D1. However, embodiments are not limited thereto.

Figure 11:
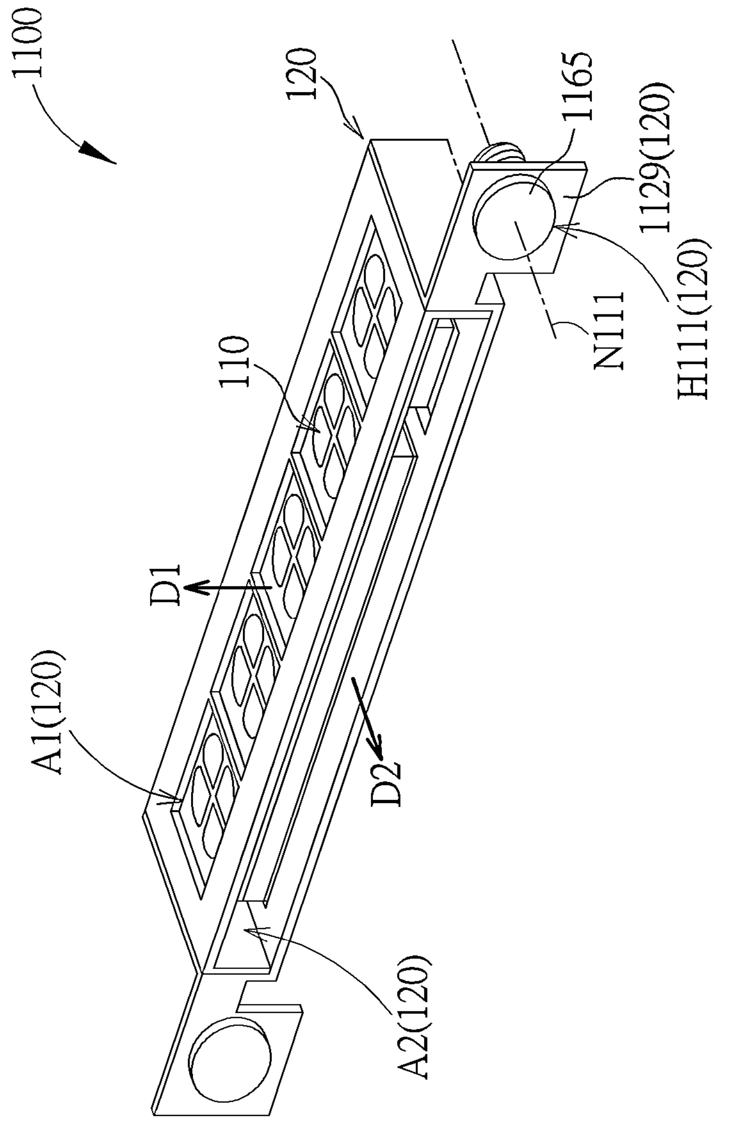
FIG. 11 illustrates an antenna device according to another embodiment.
Figure 12:
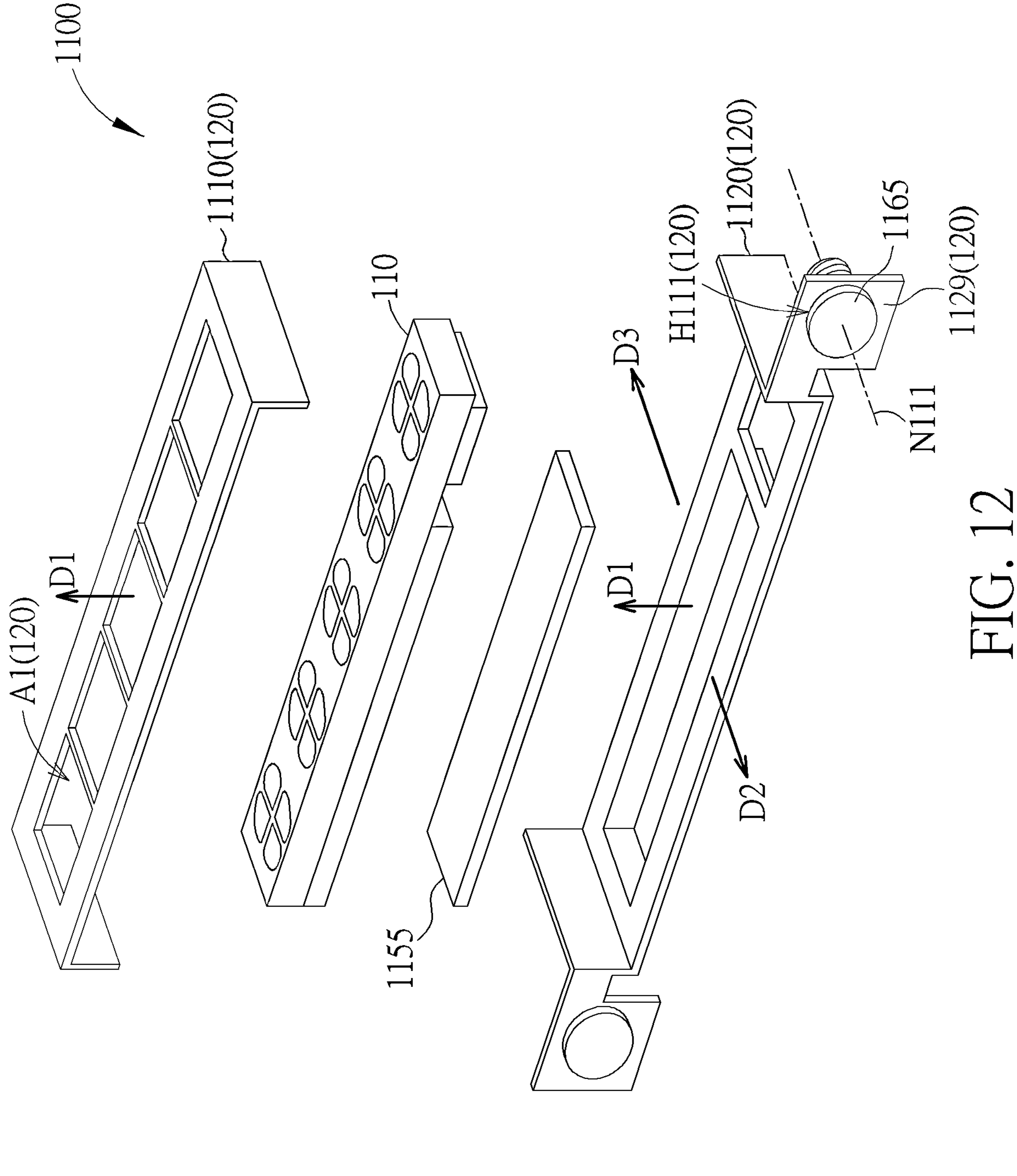
FIG. 12 illustrates the antenna device of FIG. 11 in an exploded view.

FIG. 11 illustrates an antenna device 1100 according to another embodiment. FIG. 12 illustrates the antenna device 1100 of FIG. 11 in an exploded view. In the antenna device 1100, the supporting member 120 can include a first conductive component 1110 and a second conductive component 1120. At least one of the first conductive component 1110 and the second conductive component 1120 can include a secure portion 1129. A normal N111 of the secure portion 1129 can be perpendicular to the first direction D1. Hence, a screw 1165 can pass through the hole H111 in a direction in parallel to the normal N111. For example, the screw 1165 can pass through the hole H111 along the second direction D2 or the third direction D3. Optionally, a thermal pad 1155 can be disposed for heat dissipation.

Figure 13:
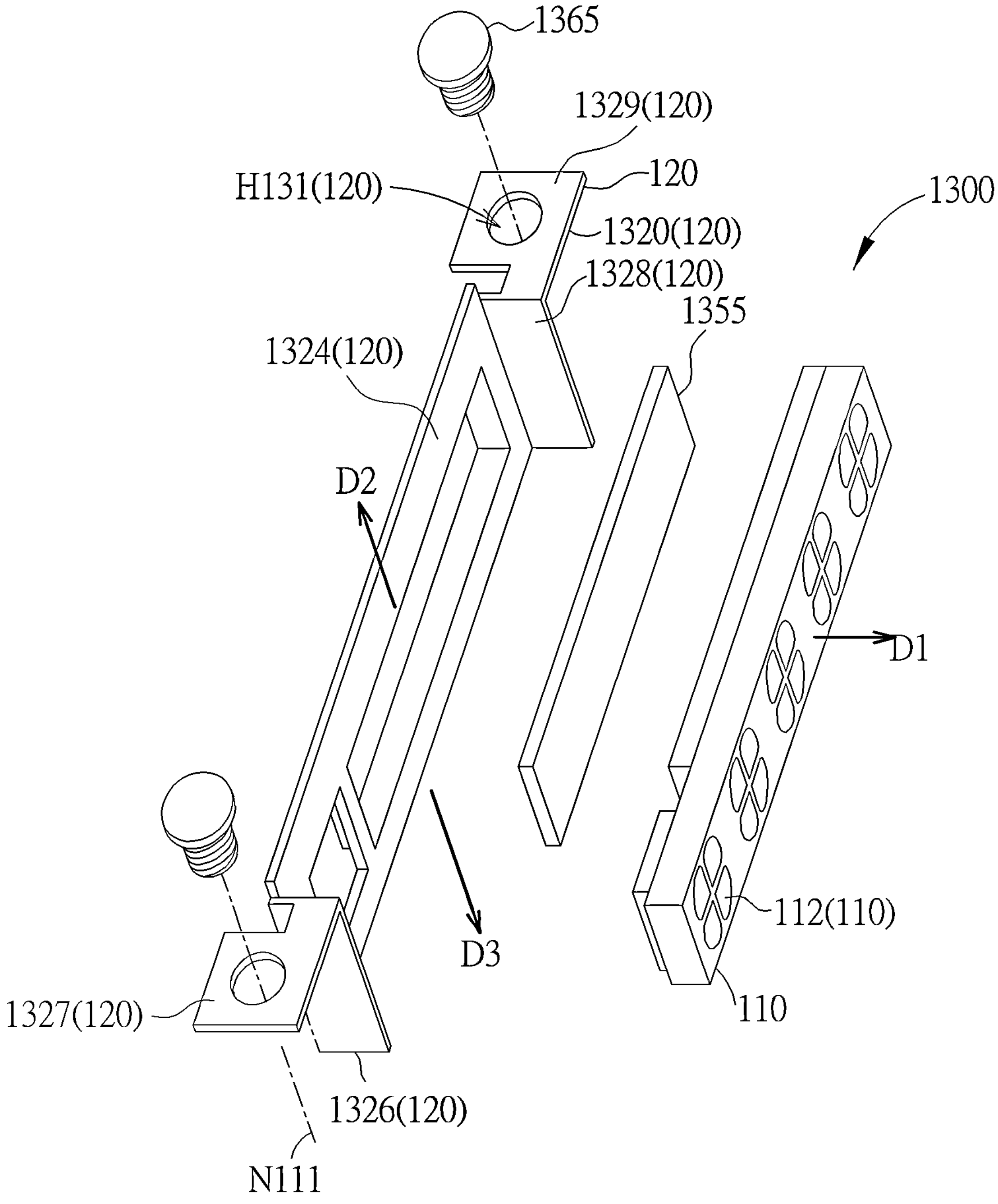
FIG. 13 illustrates an antenna device in an exploded view according to another embodiment.
Figure 14:
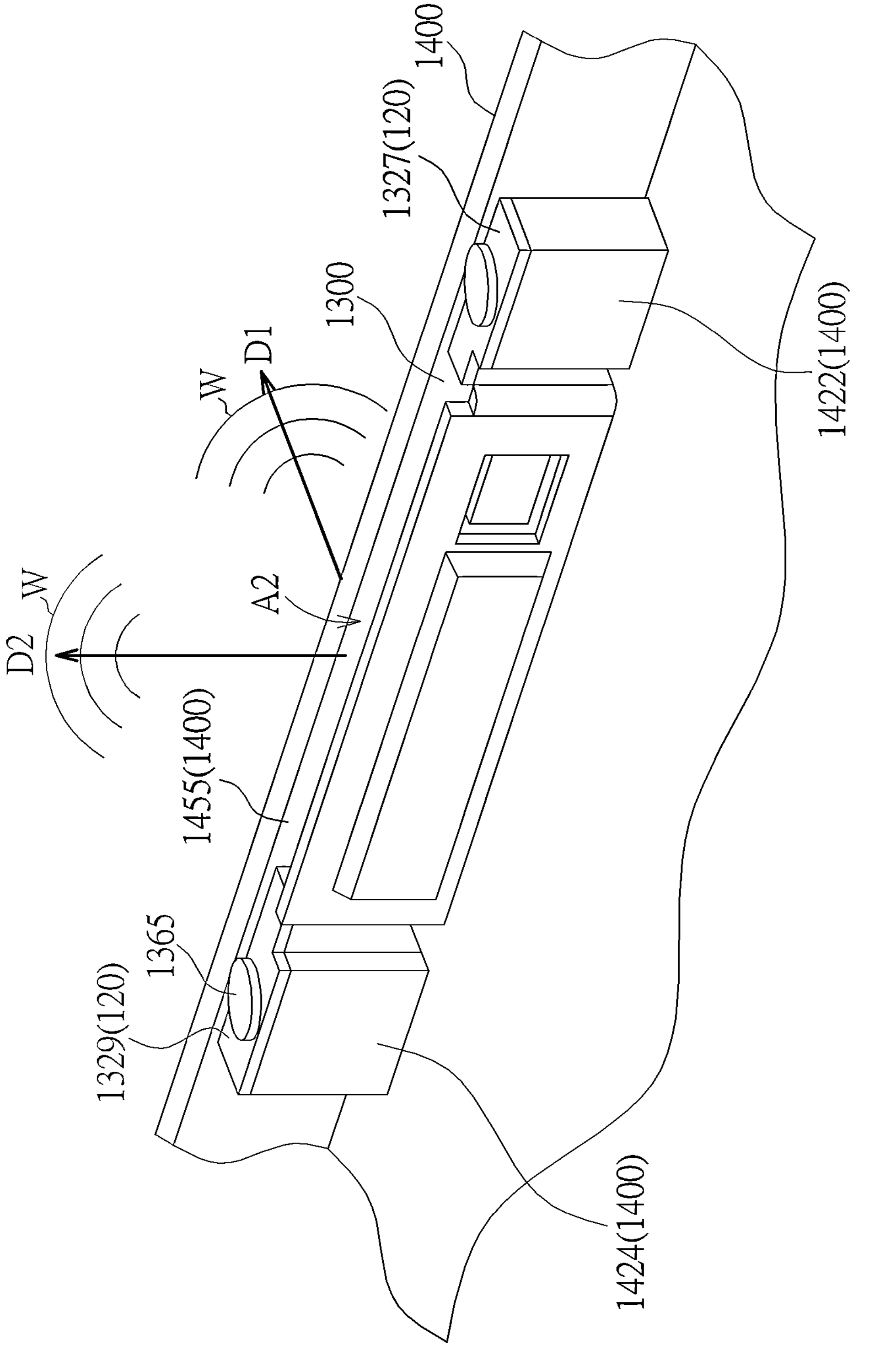
FIG. 14 illustrates an application scenario where the antenna device in FIG. 13 is affixed to the interior of a communications device.

FIG. 13 illustrates an antenna device 1300 in an exploded view according to another embodiment. FIG. 14 illustrates an application scenario where antenna device 1300 is affixed to the interior of a communications device 1400. The communications device 1400 can be a mobile phone, a tablet, a laptop or a portable device. The antenna device 1300 can include the antenna 110 and the supporting member 120. The supporting member 120 can include a conductive component 1320. The conductive component 1320 can include a conductive sheet 1324, two sidewalls 1326 and 1328, and two secure portions 1327 and 1329. Since the secure portion 1327 and the secure portion 1329 are similar, the secure portion 1329 is used as an illustrative example below. The secure portion 1329 can have a hole H131, and a normal N131 of the secure portion 1329 can be perpendicular to the first direction D1. A screw 1365 can pass through the hole H131 to secure the antenna device 1300. Optionally, a thermal pad 1355 can be disposed for heat dissipation.

As shown in FIG. 14, the communications device 1400 can include a sidewall 1455 of a chassis and two secure blocks 1422 and 1424. The secure portions 1327 and 1329 can be affixed to the secure blocks 1422 and 1424 respectively to install the antenna device 1300 in the communications device 1400.

When the antenna device radiates the electromagnetic wave W in the first direction D1, the second direction D2 and/or the third direction D3 direction, the corresponding portions of the communications device 1400 should be formed with non-conductive material (such as plastic, resin, etc.). This prevents interference with the radiation of the electromagnetic wave W. For instance, in the region corresponding to the second aperture A2 in FIG. 14, a non-metallic material (e.g. plastic) can be used for the casing to prevent electromagnetic wave shielding.

Figure 15:
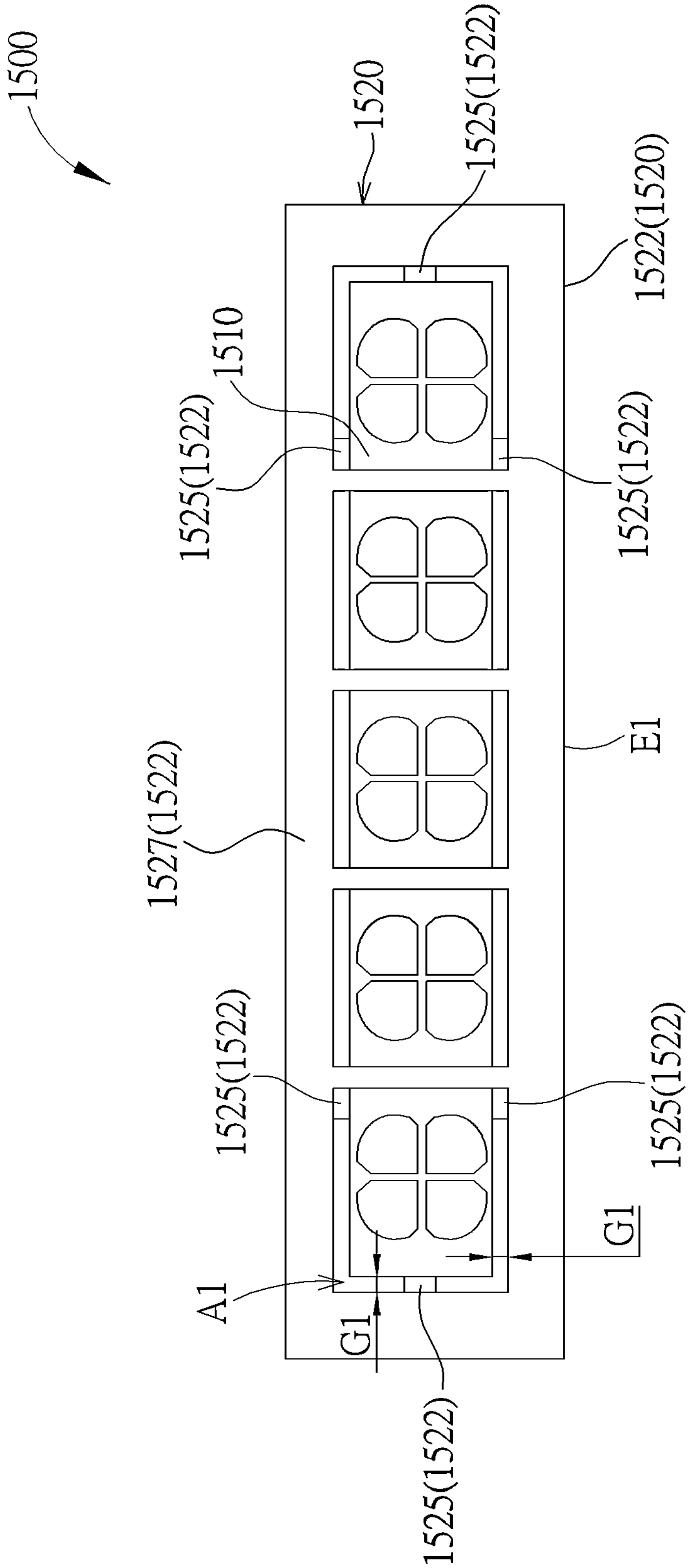
FIG. 15 illustrates an antenna device in a top view according to an embodiment.
Figure 16:
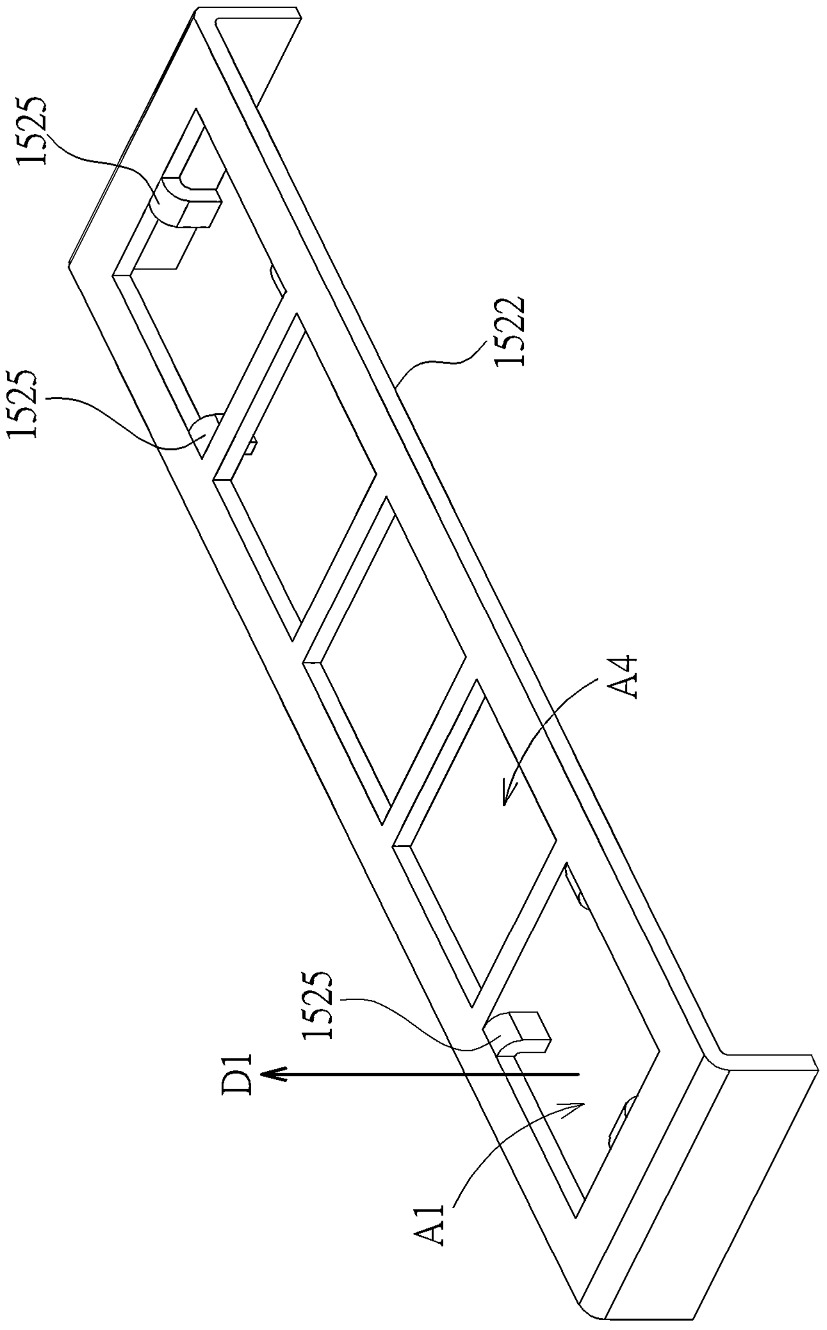
FIG. 16 illustrates a conductive component of a supporting member of the antenna device of FIG. 15.

FIG. 15 illustrates an antenna device 1500 in a top view according to an embodiment. The antenna device 1500 can include an antenna 1510 and a supporting member 1520. The supporting member 1520 can include a conductive component 1522. FIG. 16 illustrates the conductive component 1522 of the supporting member 1520 of the antenna device 1500 in FIG. 15. The conductive component 1522 can include a ring-shaped frame portion 1527 to form apertures (e.g. A1, A4) facing the first direction D1 for antenna radiation, and the conductive component 1522 can include a plurality of positioning elements 1525. The antenna 1510 can be affixed by the positioning elements 1525. The positioning elements 1525 can be connected to the frame portion 1527, and used to support, hold and/or clamp the antenna 1510 to affix the antenna 1510. With the positioning elements 1525, the size of the frame portion 1527 can be adjusted to increase the gaps G1 around the antenna 1510, enhancing the antenna gain. The antenna devices in FIG. 1 to FIG. 14 can also include the positioning elements 1525 of FIG. 15 and FIG. 16 to adjust the gaps around the antennas.

Each of the antenna devices 100, 600, 700, 900, 1100, 1300 and 1500 can be installed inside a communications device such as a mobile phone, a laptop or a tablet. Taking FIG. 15 as an example, an edge E1 of the antenna device 1500 can be in parallel or non-parallel to an edge of a case of the communications device (e.g. mobile phone). Therefore, the arrangement of the antenna device can be optimized according to requirements.

In summary, antenna devices provided by embodiments can radiate electromagnetic waves in multiple directions and offer solutions to improve reliability and antenna gain. By integrating the antenna device into a mobile phone, the durability and communication quality of the mobile phone are improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna device, comprising:

an antenna configured to radiate an electromagnetic wave; and a supporting member comprising a first conductive sheet and a second conductive sheet, and configured to accommodate and support the antenna, the supporting member having a storage space where the antenna is disposed, and the supporting member having a first aperture facing a first direction, and a second aperture facing a second direction different from the first direction;

wherein the antenna radiates the electromagnetic wave in the first direction through the first aperture and in the second direction through the second aperture;

the antenna is placed between the first conductive sheet and the second conductive sheet;

the first aperture is formed on the first conductive sheet; and the first conductive sheet has a first conductive portion between a first edge of the first conductive sheet and a first side of the antenna, and the second conductive sheet has a second conductive portion between a first edge of the second conductive sheet and the first side of the antenna; and the first conductive portion and the second conductive portion are wider than a predetermined length.

2. The antenna device of claim 1, wherein the supporting member further has a third aperture facing a third direction different from the first direction and the second direction, and the antenna radiates the electromagnetic wave further in the third direction through the third aperture.

3. The antenna device of claim 2, wherein the second direction is substantially perpendicular to the first direction, and the third direction is substantially perpendicular to the first direction and opposite to the second direction.

4. The antenna device of claim 1, wherein the electromagnetic wave has a wavelength, and the predetermined length is equal or larger than 0.03 times the wavelength.

5. The antenna device of claim 1, wherein at least one of the first conductive portion and the second conductive portion forms a right angle with the first side of the antenna.

6. The antenna device of claim 1, wherein at least one of the first conductive portion and the second conductive portion is not perpendicular to the first side of the antenna.

7. The antenna device of claim 1, wherein the first conductive portion and the second conductive portion have different widths.

8. The antenna device of claim 1, wherein the first conductive portion and the second conductive portion have a same width.

9. The antenna device of claim 1, wherein at least one of the first conductive portion and the second conductive portion has an arc shape.

10. The antenna device of claim 1, wherein:

the first conductive sheet further has a third conductive portion between a second edge of the first conductive sheet and a second side of the antenna;

the first side of the antenna and the second side of the antenna are in parallel; and the first conductive portion and the third conductive portion have different widths.

11. The antenna device of claim 1, wherein:

the second conductive sheet further has a fourth conductive portion between a second edge of the second conductive sheet and a second side of the antenna;

the first side of the antenna and the second side of the antenna are in parallel; and the second conductive portion and the fourth conductive portion have different widths.

12. The antenna device of claim 1, wherein:

the supporting member further has a fourth aperture facing the first direction and formed on the first conductive sheet, the first conductive sheet comprising a reinforcement bar configured to separate the first aperture and the fourth aperture; and the antenna further radiates the electromagnetic wave in the first direction through the fourth aperture.

13. The antenna device of claim 1, wherein the supporting member further comprises a secure portion having a hole for securing the supporting member onto a wireless communications device with a screw.

14. The antenna device of claim 13, wherein a normal of the secure portion is in line with the first direction.

15. The antenna device of claim 13, wherein a normal of the secure portion is perpendicular to the first direction.

16. The antenna device of claim 1, wherein the supporting member further comprises a plurality of positioning elements, and the antenna is affixed by the plurality of positioning elements.

17. The antenna device of claim 1, wherein:

the antenna comprises a conductive plate configured to radiate the electromagnetic wave, a circuit linked to the conductive plate and configured to process a signal corresponding to the electromagnetic wave, and a connector coupled to the circuit and configured to transmit the signal to an external circuit; and the supporting member further comprises:

a first conductive component disposed corresponding to the conductive plate of the antenna;

a second conductive component disposed corresponding to the circuit and the connector; and an opening formed on the second conductive component;

wherein the second aperture is formed between the first conductive component and the second conductive component, and the connector is coupled to the external circuit through the opening.

18. The antenna device of claim 1, wherein:

the antenna comprises a conductive plate configured to radiate the electromagnetic wave, a circuit linked to the conductive plate and configured to process a signal corresponding to the electromagnetic wave, and a connector coupled to the circuit and configured to transmit the signal to an external circuit; and the supporting member further comprises:

a conductive component disposed corresponding to the conductive plate of the antenna and comprising the first conductive sheet and two sidewalls connected to the first conductive sheet;

wherein the second aperture is formed between the sidewalls.

19. The antenna device of claim 1, wherein the antenna device is installed inside one of a mobile phone, a laptop and a tablet.

* * * * *